US010132117B2

(12) United States Patent
Munsters et al.

(10) Patent No.: US 10,132,117 B2
(45) Date of Patent: Nov. 20, 2018

(54) FLEXIBLE SUNSCREEN AND SUNSHADE ASSEMBLY PROVIDED THEREWITH

(71) Applicant: Inalfa Roof Systems Group B.V., Venray (NL)

(72) Inventors: Paulus Johannes Wilhelmus Munsters, Uden (NL); Dave Keller, Ortonville, MI (US); Martinus Wilhelmus Maria Nabuurs, Overloon (NL); Peter Christiaan Leonardus Johannes Manders, Horst (NL); Robert Rikkert, Nuenen (NL)

(73) Assignee: INALFA ROOF SYSTEMS GROUP B.V. (NL)

( * ) Notice: Subject to any disclaimer, the term of this patent is extended or adjusted under 35 U.S.C. 154(b) by 5 days.

(21) Appl. No.: 14/932,468

(22) Filed: Nov. 4, 2015

(65) Prior Publication Data
US 2016/0130872 A1    May 12, 2016

(30) Foreign Application Priority Data

Nov. 6, 2014 (EP) ..................... 14192001

(51) Int. Cl.
*B60J 1/20* (2006.01)
*E06B 9/58* (2006.01)
(Continued)

(52) U.S. Cl.
CPC .............. *E06B 9/58* (2013.01); *B60J 1/2041* (2013.01); *B60J 1/2052* (2013.01); *B60J 7/0015* (2013.01);
(Continued)

(58) Field of Classification Search
CPC ... E06B 9/58; E06B 9/581; E06B 9/40; E06B 9/42; E06B 9/44; E06B 9/54; B60J 7/0015; B60J 1/2041; B60J 1/2052; B60J 7/0023
(Continued)

(56) References Cited

U.S. PATENT DOCUMENTS

| 1,815,551 | A | * | 7/1931 | Dunn | ...................... | E06B 9/581 |
| | | | | | | 160/273.1 |
| 2,720,948 | A | * | 10/1955 | Pajak | ...................... | E04C 2/365 |
| | | | | | | 156/65 |

(Continued)

FOREIGN PATENT DOCUMENTS

| DE | 10019787 | 10/2001 |
| DE | 102004005754 | 8/2005 |

(Continued)

OTHER PUBLICATIONS

International Search Report for corresponding foreign application EP 14192001, filed Nov. 6, 2014.

*Primary Examiner* — Katherine W Mitchell
*Assistant Examiner* — Abe Massad
(74) *Attorney, Agent, or Firm* — Steven M. Koehler; Westman, Champlin & Koehler, P.A.

(57) ABSTRACT

A flexible sunscreen is provided intended for use in a sunshade assembly of the type comprising a flexible sunscreen having a central part and two opposed inwardly folded longitudinal edges connected to the central part by means of folding lines, and two opposed longitudinal guides for receiving therein and guiding corresponding ones of the inwardly folded longitudinal edges of the flexible sunscreen, which guides are provided with locking members for engaging an outer end of the inwardly folded longitudinal edges for preventing these edges from moving out of the longitudinal guides. The central part of the flexible sunscreen
(Continued)

mainly is manufactured from a first material with a first stiffness wherein of the inwardly folded longitudinal edges and of the parts of the central part adjacent the edges at least part is made of a second material with a second higher stiffness.

12 Claims, 7 Drawing Sheets

(51) Int. Cl.
  *B60J 7/00*     (2006.01)
  *E06B 9/40*     (2006.01)
  *E06B 9/42*     (2006.01)
  *E06B 9/44*     (2006.01)
  *E06B 9/54*     (2006.01)
  *E06B 9/68*     (2006.01)

(52) U.S. Cl.
  CPC ................ *E06B 9/40* (2013.01); *E06B 9/42* (2013.01); *E06B 9/44* (2013.01); *E06B 9/54* (2013.01); *E06B 9/68* (2013.01)

(58) Field of Classification Search
  USPC ......................................................... 160/269
  See application file for complete search history.

(56) References Cited

U.S. PATENT DOCUMENTS

| | | | | |
|---|---|---|---|---|
| 3,017,927 A | * | 1/1962 | Demko | E06B 9/581 160/271 |
| 3,116,097 A | * | 12/1963 | Novales | E06B 9/581 160/271 |
| 4,987,943 A | * | 1/1991 | Charest | E06B 9/54 160/120 |
| 4,996,095 A | * | 2/1991 | Behdorf | B32B 15/14 428/215 |
| 5,392,836 A | * | 2/1995 | West | E05B 65/0021 160/273.1 |
| 5,524,406 A | * | 6/1996 | Ragland | B23K 11/087 219/117.1 |
| 6,179,373 B1 | * | 1/2001 | Bohm | B60J 7/0015 160/273.1 |
| 6,776,211 B2 | * | 8/2004 | Schlecht | B60J 1/2027 160/120 |
| 7,028,741 B2 | * | 4/2006 | Coenraets | E06B 9/13 160/271 |
| 8,690,234 B2 | * | 4/2014 | Rockelmann | B60J 7/0015 296/214 |
| 9,233,600 B2 | * | 1/2016 | Nellen | B60J 7/0435 |
| 2007/0187977 A1 | | 8/2007 | Mollick | |
| 2008/0197655 A1 | * | 8/2008 | Oerke | B60J 1/2041 296/83 |
| 2009/0033113 A1 | | 2/2009 | Albert | |
| 2009/0145559 A1 | * | 6/2009 | Glasl | B60J 1/2041 160/273.1 |
| 2009/0174217 A1 | | 7/2009 | Lawall | |
| 2009/0178771 A1 | * | 7/2009 | Lin | B60J 7/0015 160/370.22 |
| 2012/0111511 A1 | | 5/2012 | Kitani | |
| 2014/0158313 A1 | * | 6/2014 | McTavish | E06B 9/58 160/270 |
| 2016/0221424 A1 | * | 8/2016 | Van Boxtel | B60J 7/067 |
| 2016/0257184 A1 | * | 9/2016 | Van Boxtel | B60J 7/0015 |

FOREIGN PATENT DOCUMENTS

| | | |
|---|---|---|
| DE | 102004028882 | 1/2006 |
| DE | 202007009971 | 11/2007 |
| DE | 102008064054 | 7/2009 |
| EP | 2450209 | 5/2012 |
| WO | 2006060990 | 6/2006 |

\* cited by examiner

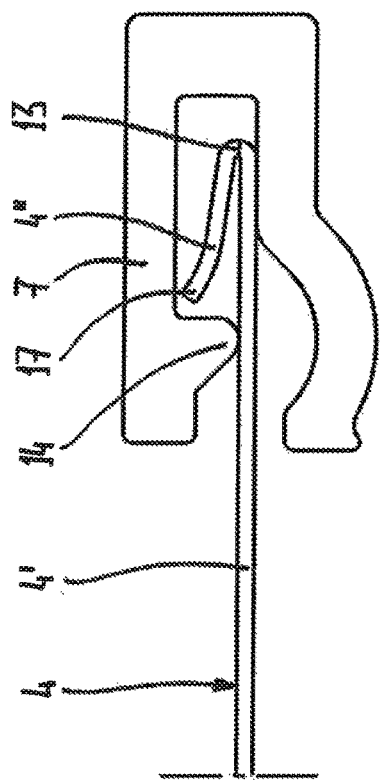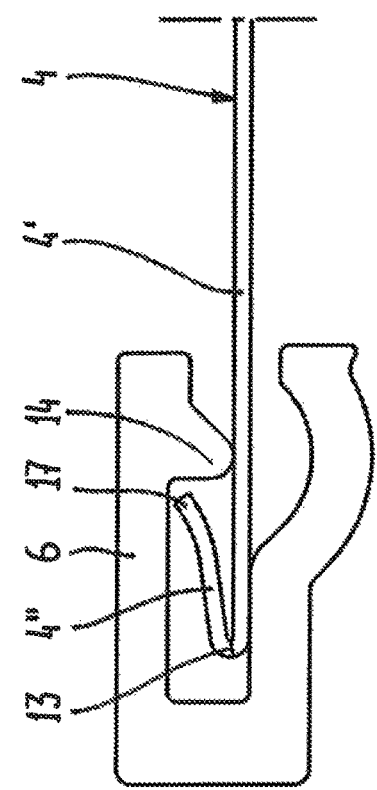
Fig. 2

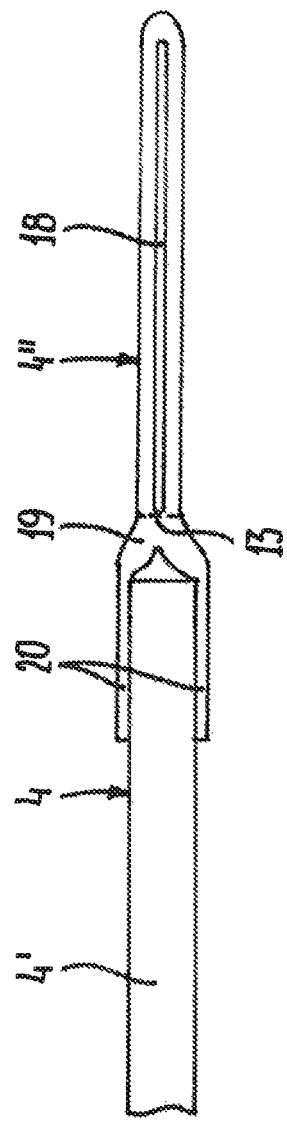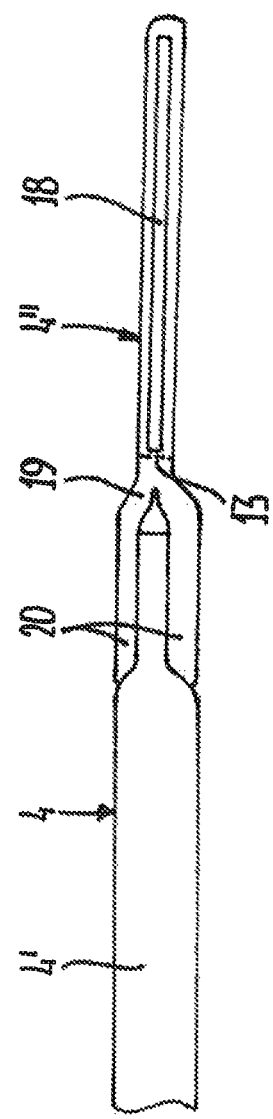
Fig. 8
Fig. 9

FLEXIBLE SUNSCREEN AND SUNSHADE ASSEMBLY PROVIDED THEREWITH

BACKGROUND

The discussion below is merely provided for general background information and is not intended to be used as an aid in determining the scope of the claimed subject matter.

Aspects of the invention relate to a flexible sunscreen intended for use in a sunshade assembly of the type comprising:

a flexible sunscreen having a central part and two opposed inwardly folded longitudinal edges connected to the central part by means of folding lines;

two opposed longitudinal guides for receiving therein and guiding corresponding ones of the inwardly folded longitudinal edges of the flexible sunscreen, which guides are provided with locking members for engaging an outer end of the inwardly folded longitudinal edges for preventing these edges from moving out of the longitudinal guides.

In some state of the art sunshade assemblies of such a type the cooperation between the guide locking members (for example a ridge extending from a guide leg into a guide channel) and the outer end of the inwardly folded longitudinal edges not always may prevent that a longitudinal edge comes out of the guide (that means that such a guide cannot withstand a sufficient high level of lateral pull out force acting on the flexible sunscreen). This problem, among others, may be caused by the size of an entrance opening of the guide channel. One solution would be to reduce such size, but in some embodiments this is not possible because also other larger dimensioned members (other than the sunscreen's longitudinal edges) are guided in the guide channel. Further, reducing the size of the entrance opening (or of other parts of the guide) can cause problems with tools used to manufacture such a guide (for example an extrusion tool, when used, then would be prone to premature collapse), whereas further due to wear of manufacturing tools it is very difficult (or nearly impossible) to maintain the dimensions of the guide, thus leading to an end product (guide) with properties which vary in an unpredictable manner.

It is an object of the present invention to provide an improved flexible sunscreen of the above type.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

The flexible sunscreen is characterized in that the central part of the flexible sunscreen mainly is manufactured from a first material with a first stiffness and wherein of the inwardly folded longitudinal edges and of the parts of the central part adjacent the edges at least part is made of a second material with a second higher stiffness.

Thus it is possible to offer said part of the longitudinal edges and/or of the parts of the central part adjacent the edges such a stiffness that the flexible sunscreen with said edges is better retained in the longitudinal guides, while keeping the flexible sunscreen sufficiently flexible (for example for allowing it to be wound on a winding shaft).

The stiffness of said edges may vary in different directions. Generally the stiffness in transverse direction should be sufficiently high for preventing that the longitudinal edges are pulled out of the longitudinal guides; in a longitudinal direction, however, the stiffness should be sufficiently low to allow an easy winding of the sunscreen on the winding shaft. Such different degrees of stiffness in different directions may be obtained by a material which is not uniform in all directions (for example a material comprising fibres oriented in specific directions).

In one embodiment of the flexible sunscreen the coefficient of friction of the second material is lower than the coefficient of friction of the first material. This results in a reduction of handling/driving forces required for moving the flexible sunscreen longitudinally along the longitudinal guides.

It is noted that the use of two different materials for the central part and for the longitudinal edges also allows other properties of said materials to be different, if required.

It is conceivable that the second material is a plastic material, but also other materials (such as natural materials) may be used.

In a specific embodiment of the flexible sunscreen, the second material is impregnated in at least part of the surfaces of the inwardly folded longitudinal edges. As a result the dimensions (specifically the thickness) of the longitudinal edges substantially will remain the same, which may be advantageous when the dimensions of the longitudinal edges and the longitudinal guides have been matched during design.

In such a case it is conceivable that the second material too is impregnated in the surfaces of parts of the central part of the flexible sunscreen adjacent the edges and wherein the flexible sunscreen at the folding line has a restricted thickness. Generally, too impregnating parts of the central part will lead to a design in which the flexible sunscreen at the folding lines is (at least partially) impregnated and this could detrimentally influence the folding capacity. By applying a (restriction with) restricted thickness this may be compensated.

In another type of embodiments of the flexible sunscreen the second material is embodied as a separate layer of said second material at least partly surrounding and at least partly attached to the edges. In this case the outer dimensions (such as thickness) of the inwardly folded longitudinal edges generally will increase. The manner in which such a separate layer is attached may differ; as an non-limiting example it is conceivable to use an adhesive or to use welding techniques.

For example it is possible that the inwardly folded longitudinal edges each, in the folded position, define an inner surface and an outer surface and wherein said separate layer at the inner surface extends substantially up to the folding line and wherein said separate layer at the outer surface ends at a distance from said folding line, wherein said distance ranges from 5-50% of the width of the inwardly folded longitudinal edges measured between a folding line and respective outer end. The said distance over which the separate layer is missing seems beneficial in the overall performance of the longitudinal edges and results in a promising increase of the pull-out force of the longitudinal edges. The precise percentage may depend on different factors, among which dimensions and materials used.

As an alternative the inwardly folded longitudinal edges each, in the folded position, again may define an inner surface and an outer surface and wherein said separate layer at the inner surface extends substantially up to the folding line and wherein said separate layer at the outer surface ends at a distance beyond said folding line and extends over at least part of the central part of the flexible sunscreen. In such a case the separate layer at the lower surface will continue over and past the folding line. As a result the parts of the central part next to the folding lines may be strengthened.

In such a case it is conceivable that the part of the separate layer extending beyond the folding line is not attached to said central part of the flexible sunscreen, such that the folding capacity remains sufficiently.

In an embodiment of the flexible sunscreen the inwardly folded longitudinal edges are completely made of said second material which partly encloses and/or extends through the central part of the sunscreen and which at the location of the folding line has a restricted thickness. The central part, for example, may comprise through-holes through which the second material extends from one surface to the opposite surface.

Whereas in the most common configuration the inwardly folded longitudinal edges are folded such that they (in a normal operational position of the flexible sunscreen) extend above the central part, in a special embodiment the inwardly folded longitudinal edges extend below the central part of the sunscreen. This may promote the manner in which said longitudinal edges are retained in the longitudinal guides.

In a second aspect the invention relates to a sunshade assembly comprising a flexible sunscreen having two opposed inwardly folded longitudinal edges, a leading edge and a trailing edge, a winding shaft for winding and unwinding the flexible sunscreen at its trailing edge, an operating beam attached to the leading edge and two opposed longitudinal guides for receiving therein and guiding corresponding ones of the inwardly folded longitudinal edges of the flexible sunscreen, which guides are provided with locking members for engaging an outer end of the inwardly folded longitudinal edges for preventing these edges from moving out of the longitudinal guides, wherein the flexible sunscreen is embodied in accordance with the present invention.

BRIEF DESCRIPTION OF THE DRAWINGS

Hereinafter aspects of the invention will be elucidated while referring to the drawings, in which:

FIG. 2 shows a partial cross section according to II-II in FIG. 1, and

FIGS. 3-10 illustrate different embodiments, each with an edge in a flat configuration.

DETAILED DESCRIPTION OF THE ILLUSTRATIVE EMBODIMENTS

Figure 1:
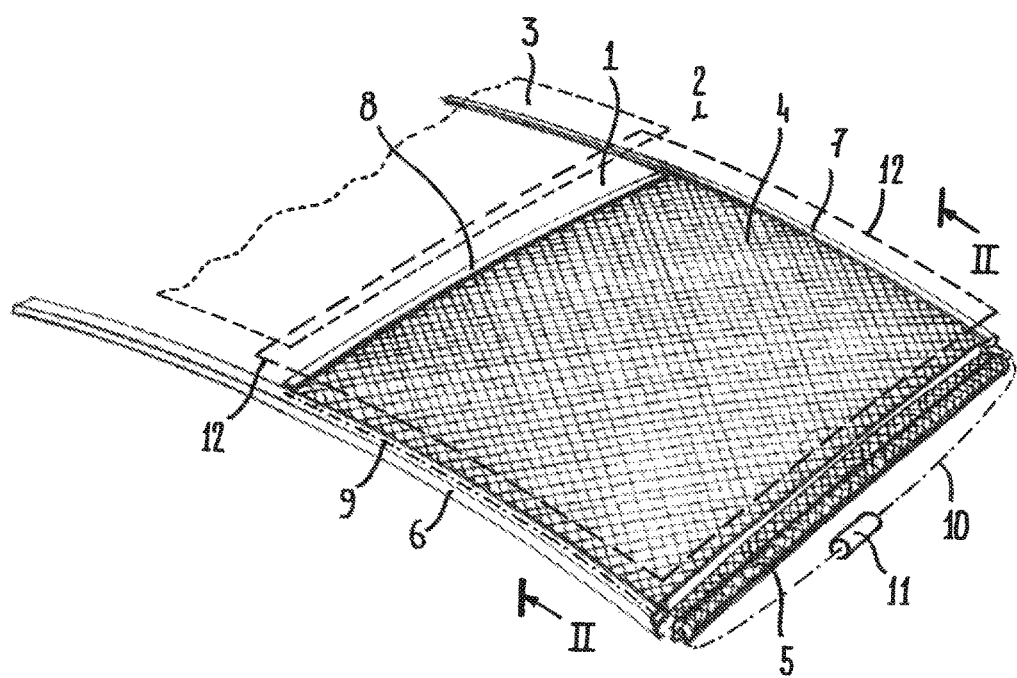
FIG. 1 shows schematically and in a perspective view, a sunshade assembly applied to an open roof construction.

Firstly referring to FIG. 1, an example is illustrated of an open roof construction for a vehicle having a roof assembly and comprising a sunscreen assembly in which a flexible sunscreen may be incorporated. Said roof assembly is for opening and closing a roof opening 1 in a stationary roof part 2 of the vehicle and includes a movable closure panel 3 which, by means not illustrated in detail but known per se, can be moved for opening and closing said roof opening 1. Commonly, as is known, the movable panel 3 is guided in longitudinal panel guides mounted in or formed in the stationary roof part 2 along longitudinal sides 12 of the roof opening 1. A user operated device such as a motor or crank (not illustrated) is operably coupled to the panel 3 via cables or the like to move the panel 3 selectively between its open and closed positions. In FIG. 1 the closure panel 3 has been illustrated in a position in which it opens the roof opening 1.

Below the roof opening 1 a sunshade assembly is positioned. Basically, said sunshade assembly comprises a flexible sunscreen 4, a rotatable winding shaft 5 for winding and unwinding the sunscreen 4 at a first transversal trailing edge and two opposite longitudinal guides 6 and 7. The panel guides 6, 7 can be connected to or formed integral from a single unitary body with the guides of the closure panel (not illustrated). Likewise, the guides 6, 7 can be separate from the guides of the panel 3. Drive members may be provided, which in FIG. 1 have been illustrated schematically by dotted lines 9, 10. As is known per se, the drive members may comprise longitudinal members driven by an actuator 11 for a reciprocating movement for winding and unwinding the flexible sunscreen 4.

Each drive member 9, 10 is connected to an operating beam 8 provided at a transversal leading edge of the sunscreen 4 remote from the trailing edge. Although the reciprocating movement of the sunscreen 4 primarily is generated by the reciprocating movement of the drive members 9 and 10 as caused by the actuator 11, it is possible too that in addition the winding shaft 5 is preloaded in a sense for winding the sunscreen 4 thereon. Further it should be noted that the movement of the sunscreen 4 also may be initiated manually by engaging the operating beam 8.

Now, reference is made to FIG. 2 which schematically shows a cross section according to II-II in FIG. 1 in which only the flexible sunscreen 4 and the longitudinal guides 6,7 have been represented. The flexible sunscreen 4 has a central part 4' and two opposed inwardly folded longitudinal edges 4" connected to the central part by means of folding lines 13. The opposed longitudinal guides 6, 7 for receiving therein and guiding corresponding ones of the inwardly folded longitudinal edges 4" of the flexible sunscreen 4 are provided with locking members 14 for engaging an outer end 17 of the inwardly folded longitudinal edges 4" for preventing these edges from moving out of the longitudinal guides. An aspect of the present invention relates to improvements of said edges 4" (and, in some cases, of the parts of the central part 4' adjacent the folding lines 13) such that the retention thereof in the guides 6, 7 is improved. Generally, the central part 4' of the flexible sunscreen mainly is manufactured from a first material with a first stiffness, while at least part of the inwardly folded longitudinal edges 4" is made of a second material with a second higher stiffness. It is also possible that the coefficient of friction of the second material is lower than the coefficient of friction of the first material. The second material may be a plastic material.

In the embodiment according to FIG. 2 the inwardly folded longitudinal edges 4" are slightly curved (having a curvature which may be varied as desired). This may provide functional advantages, depending on the specific circumstances; in other embodiments these edges 4" may be straight.

Figure 3:
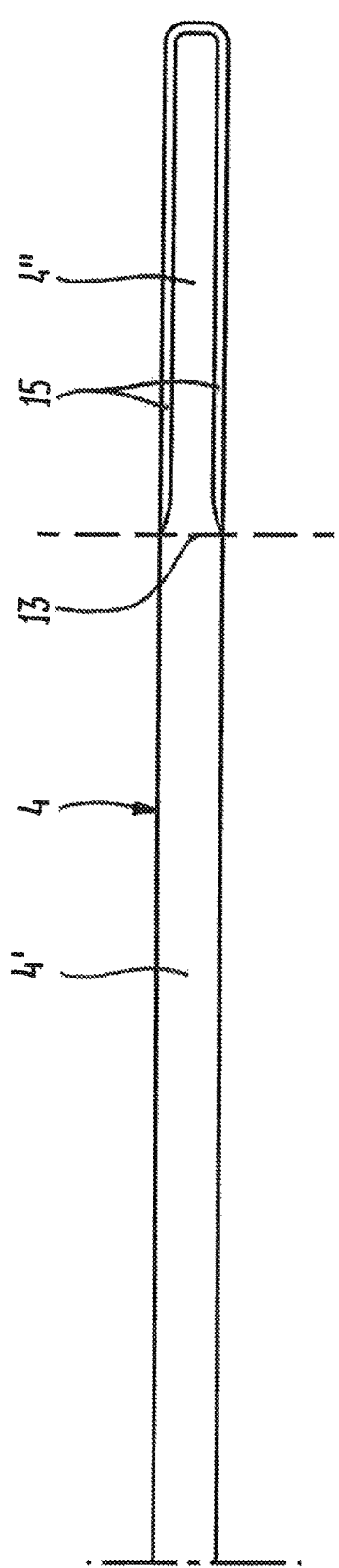
Figure 4:
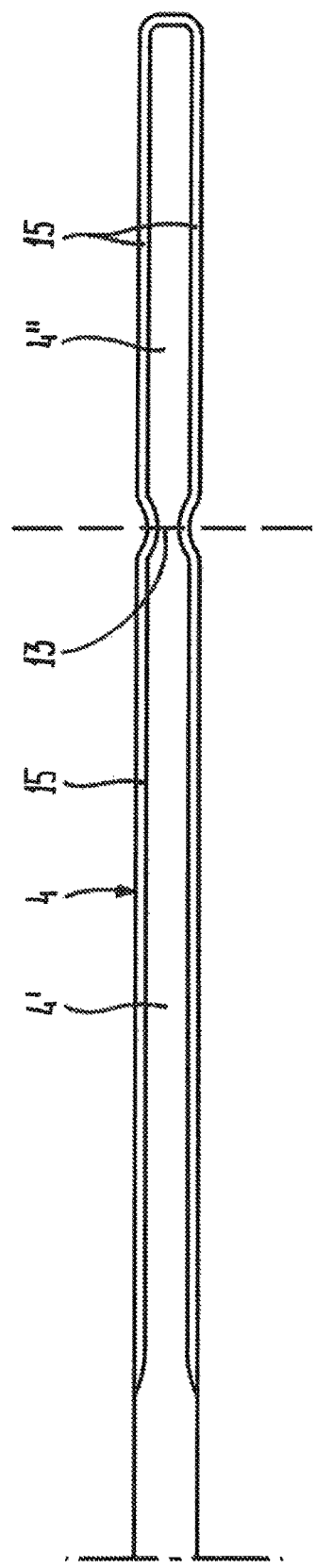

FIG. 3 shows an embodiment in which the second material is impregnated for forming an impregnated part 15 in at least part of the surfaces of the inwardly folded longitudinal edges 4" (only one edge of which has been illustrated in a flat configuration, this type of view also applies too to the remaining figures). Although the impregnation 15 ends at the folding line 13, it also may end before or after it, as illustrated in FIG. 4 showing that the second material too is impregnated in the surfaces of parts of the central part 4' of the flexible sunscreen 4 adjacent the edges 4". Further one can see that flexible sunscreen 4 at the folding line 13 has a restricted thickness for maintaining sufficient folding capability.

Figure 5:
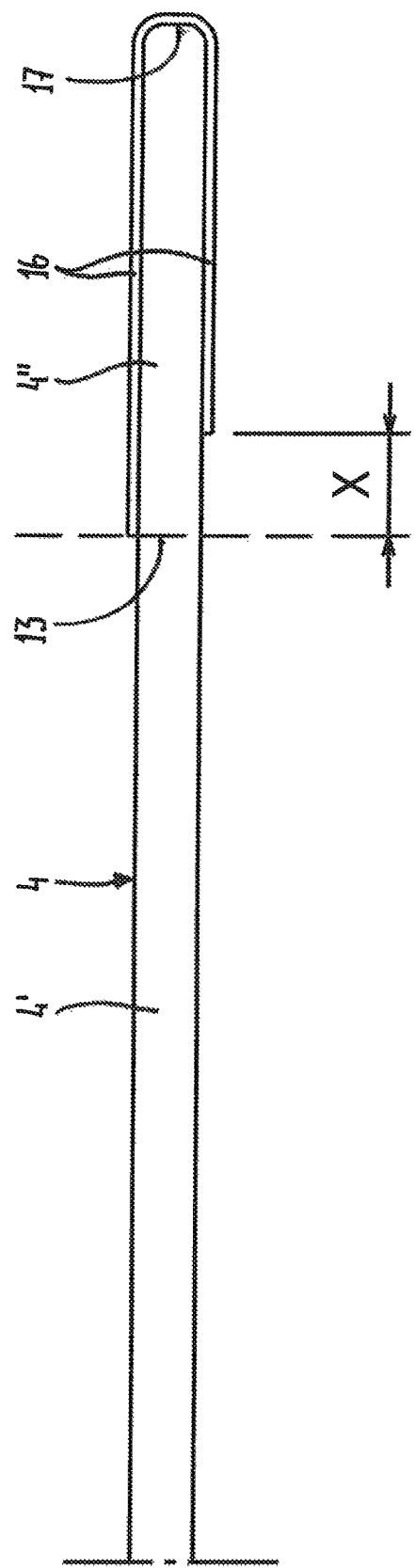

In FIG. 5 an embodiment of the flexible sunscreen 4 is illustrated in which the second material is embodied as a separate layer (or strip) 16 of said second material which at least partly surrounds and at least partly is attached to the edges 4" (for example by welding or the use of an adhesive).

The inwardly folded longitudinal edges 4" each, in the folded position, define an inner surface (in FIG. 5 at the top) and an outer surface (in FIG. 5 at the bottom). Said separate layer 16 at the inner surface extends substantially up to the folding line 13 and at the outer surface ends at a distance X from said folding line 13, wherein said distance X ranges from 5-50% of the width of the inwardly folded longitudinal edges 4" measured between the folding line 13 and a respective outer end 17.

Figure 6:
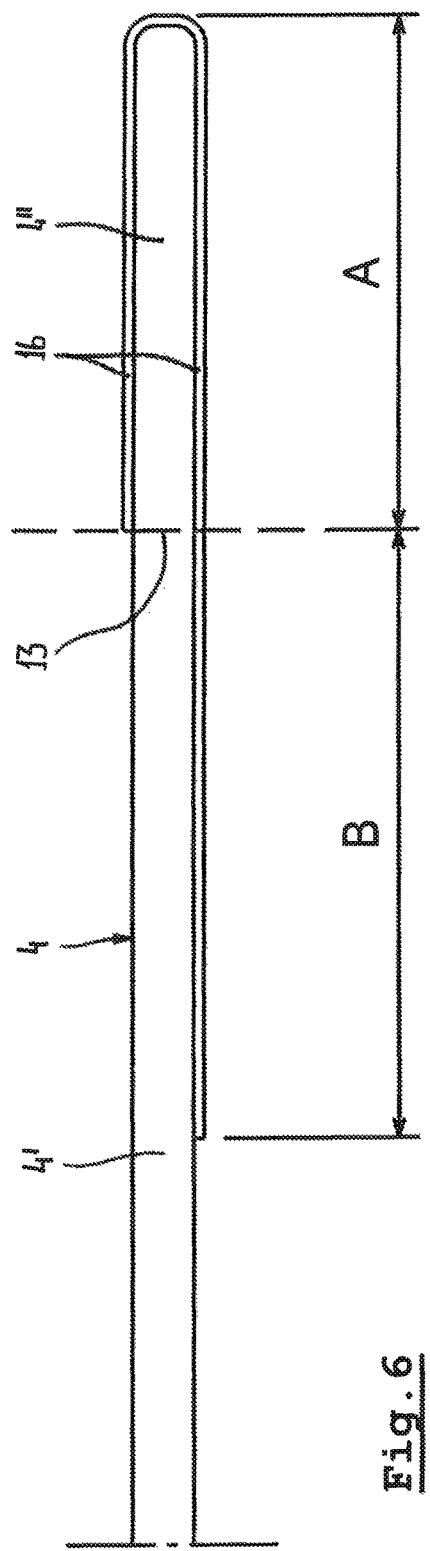

FIG. 6 illustrates a similar embodiment, but in this case the separate layer 16 at the outer surface ends at a distance beyond said folding line 13 and extends over at least part of the central part 4' of the flexible sunscreen 4. The indicated distances A and B may be identical or not.

Figure 7:
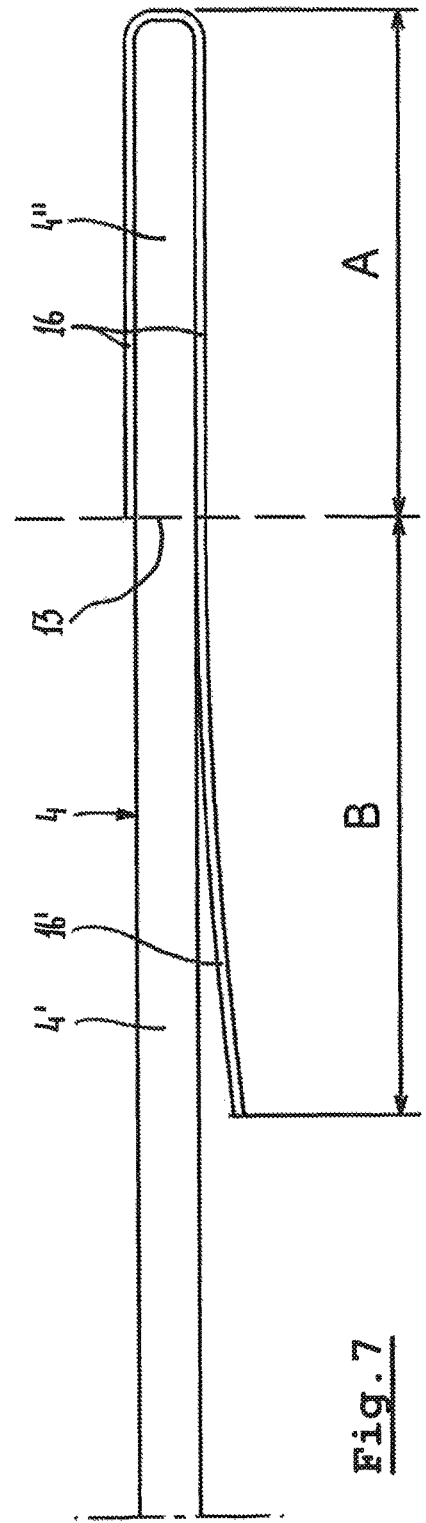

As illustrated in FIG. 7, the part 16' of the separate layer 16 extending beyond the folding line 13 may not be attached to said central part 4' of the flexible sunscreen 4, again for promoting the folding ability.

Referring to FIGS. 8 and 9, embodiments of the flexible sunscreen 4 are illustrated in which the inwardly folded longitudinal edges 4" are completely made of an assembly of a member 19 made of said second material and a reinforcement 18 enclosed therein and extending longitudinally along the edges 4". In both embodiments said member 19 comprises two opposite legs 20 enclosing and attached to a part of the central part 4' of the sunscreen 4. In FIG. 8 said part has the same thickness as the remaining part of the central part 4', but in FIG. 9 it has a reduced thickness, such that there is no (or hardly any) step at the interface between the central part 4' and those legs 20. The position of the folding line 13 is at or proximate to the start of the legs 20.

Figure 10:
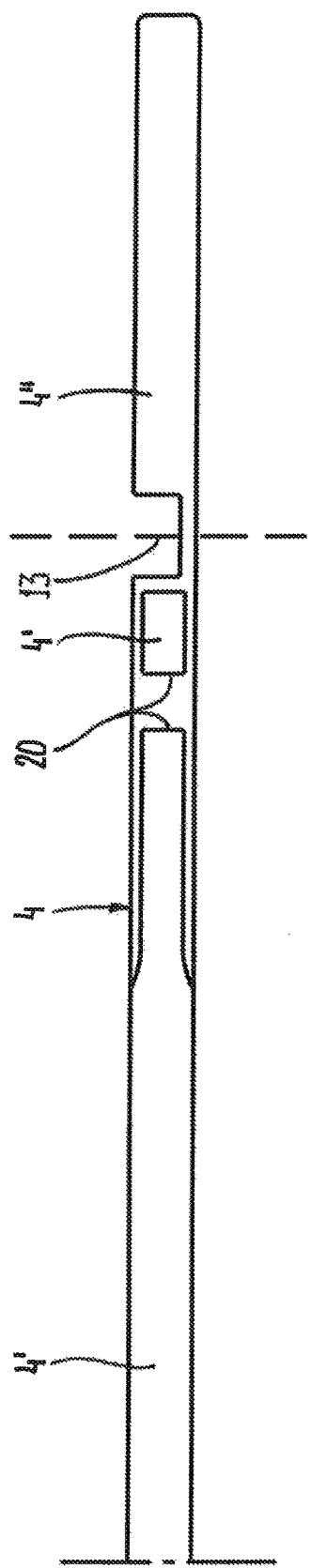

Finally, in FIG. 10 an embodiment is shown in which the inwardly folded longitudinal edges 4" are completely made of said second material which partly encloses and/or extends through the central part 4' of the sunscreen 4 and which at the location of the folding line 13 has a restricted thickness (for example for defining a so-called living hinge or film hinge). The central part 4' may be provided with through-holes 20 through which the second material extends for obtaining a very effective coherence between the central part 4' and the edges 4".

In other embodiments (not illustrated) the following features may be incorporated: when the longitudinal edges 4" comprise a core of the (original) first material surrounded by a separate layer 16 of the second material, the core may have a reduced thickness such that the overall thickness of the edges 4" substantially is the same as the thickness of the central part 4' of the flexible sunscreen 4; this may apply too to parts of the central part 4' close to the folding lines 13; in an outer free end tip of an edge 4" completely made of the second material reinforcement wires may extend longitudinally; a separate layer 16 surrounding the edge 4" and extending over and beyond the folding line 13 may be provided with openings coinciding with the folding line 13; a folding line 13 may be replaced by a hinge.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A sunshade assembly comprising:
    a flexible sunscreen having a central part and two opposed inwardly folded longitudinal edges, each inwardly folded longitudinal edge being connected to the central part proximate a folding line, and
    two opposed longitudinal guides configured to receive therein and guide corresponding ones of the inwardly folded longitudinal edges of the flexible sunscreen, which guides are provided with locking members configured to engage an outer end of the inwardly folded longitudinal edges to prevent said inwardly folded longitudinal edges from moving out of the longitudinal guides,
    wherein a first portion of the central part of the flexible sunscreen between the two inwardly folded edges is manufactured from a first material with a first stiffness and wherein the inwardly folded longitudinal edges and at least a part of a second portion of the central part adjacent the edges are made of a second material with a second higher stiffness, wherein each folding line is formed in the second material,
    wherein the inwardly folded longitudinal edges are completely made of an assembly of a member made of said second material and a separate reinforcement enclosed in said member,
    wherein the second portion of the central part comprises two opposite legs of the second material enclosing and attached to the first material of the central part of the sunscreen, and
    wherein in an inwardly folded position within its guide, each inwardly folded longitudinal edge is positioned entirely inwardly of its folding line.

2. The sunshade assembly according to claim 1, wherein the inwardly folded longitudinal edges and the second portion of the central part adjacent the edges are partly made of the second material with the second higher stiffness.

3. The sunshade assembly according to claim 1, wherein a coefficient of friction of the second material is lower than a coefficient of friction of the first material.

4. The sunshade assembly according to claim 1, wherein the second material is a plastic material.

5. The sunshade assembly according to claim 1, wherein the second material is impregnated in surfaces of parts of the second portion of the central part adjacent the edges and wherein the flexible sunscreen at the folding line has a reduced thickness.

6. The sunshade assembly according to claim 1, wherein the second material comprises a separate layer of said second material at least partly surrounding and at least partly attached to the edges.

7. The sunshade assembly according to claim 6, wherein the inwardly folded longitudinal edges each, in the inwardly folded position, define an inner surface and an outer surface and wherein said separate layer at the inner surface extends substantially up to the folding line and wherein said separate layer at the outer surface ends at a distance from said folding line, wherein said distance ranges from 5-50% of a width of the inwardly folded longitudinal edges measured between a folding line and respective outer end.

8. The sunshade assembly according to claim 6, wherein the inwardly folded longitudinal edges each, in the inwardly folded position, define an inner surface and an outer surface and wherein said separate layer at the inner surface extends substantially up to the folding line and wherein said separate layer at the outer surface ends at a distance beyond said folding line and extends over at least part of the central part of the flexible sunscreen.

9. The sunshade assembly according to claim 8, wherein the part of the separate layer extending beyond the folding line is not attached to said central part of the flexible sunscreen.

10. The sunshade assembly according to claim 1, wherein said second material of the inwardly folded longitudinal edges partly encloses or extends through the central part of the sunscreen and, at the folding line, has a reduced thickness.

11. The sunshade assembly according to claim 1, wherein a combination of the two opposite legs enclosing and attached to the second portion of the central part of the sunscreen and the second portion of the central part has a same thickness as the first portion of the central part.

12. A sunshade assembly comprising:
- a flexible sunscreen having a central part and two opposed inwardly folded longitudinal edges, each inwardly folded longitudinal edge being connected to the central part proximate a folding line, and
- two opposed longitudinal guides configured to receive therein and guide corresponding ones of the inwardly folded longitudinal edges of the flexible sunscreen, which guides are provided with locking members configured to engage an outer end of the inwardly folded longitudinal edges to prevent said inwardly folded longitudinal edges from moving out of the longitudinal guides,
- wherein a first portion of the central part of the flexible sunscreen between the two inwardly folded edges is manufactured from a first material with a first stiffness and wherein the inwardly folded longitudinal edges and at least a part of a second portion of the central part adjacent the edges at least part is made of a second material with a second higher stiffness,
- wherein each folding line is formed in the second material, wherein the inwardly folded longitudinal edges are completely made of an assembly of a member made of said second material and a reinforcement enclosed in said member,
- wherein the second portion of the central part comprises a portion of the first material having opposed legs made of the second material on opposite sides of the first material,
- wherein said second portion of the central part has a reduced thickness for reducing or eliminating a step at an interface between the second portion of the central part and said legs, and
- wherein in an inwardly folded position within its guide, each inwardly folded longitudinal edge is positioned entirely inwardly of its folding line.

* * * * *